United States Patent
Kameyama (10) Patent No.: US 8,704,471 B2
(45) Date of Patent: Apr. 22, 2014

(54) MOTOR CONTROL DEVICE

(75) Inventor: Hiroyuki Kameyama, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 248 days.

(21) Appl. No.: 13/498,534

(22) PCT Filed: Sep. 21, 2010

(86) PCT No.: PCT/JP2010/066304
§ 371 (c)(1),
(2), (4) Date: Mar. 27, 2012

(87) PCT Pub. No.: WO2011/040283
PCT Pub. Date: Apr. 7, 2011

(65) Prior Publication Data
US 2012/0181960 A1    Jul. 19, 2012

(30) Foreign Application Priority Data

Sep. 29, 2009   (JP) .................................. 2009-224339

(51) Int. Cl.
*H03K 5/00*   (2006.01)
(52) U.S. Cl.
USPC .................. 318/400.13; 318/400.35; 318/438; 318/768
(58) Field of Classification Search
CPC .... H02P 1/265; H02P 27/045; H02P 2209/05
USPC .................. 318/400.13, 400.35, 438, 768
See application file for complete search history.

(56) References Cited

U.S. PATENT DOCUMENTS

| | | | |
|---|---|---|---|
| 6,208,113 B1 * | 3/2001 | Lelkes et al. | 318/807 |
| 6,388,416 B1 | 5/2002 | Nakatani et al. | |
| 7,310,486 B2 * | 12/2007 | Kawazu et al. | 399/69 |
| 7,723,964 B2 * | 5/2010 | Taguchi | 323/222 |
| 2010/0195352 A1 * | 8/2010 | Murofushi | 363/20 |
| 2011/0227522 A1 * | 9/2011 | Shinomoto et al. | 318/400.29 |

FOREIGN PATENT DOCUMENTS

| | | |
|---|---|---|
| JP | 5-236789 A | 9/1993 |
| JP | 9-264260 A | 10/1997 |
| JP | 2001-112287 A | 4/2001 |
| JP | 2002-51589 A | 2/2002 |
| JP | 2004-180489 A | 6/2004 |
| JP | 2010-288331 A | 12/2010 |

* cited by examiner

*Primary Examiner* — Erick Glass
(74) *Attorney, Agent, or Firm* — Birch, Stewart, Kolasch & Birch, LLP (57) ABSTRACT

A zero-cross detection unit monitors an AC voltage detected by a voltage sensor, generates a zero-cross point signal when the voltage crosses 0V, and supplies the signal to a controller. A rotation number setting unit sets a rotation number command to serve as a target of a synchronous motor. A rotation number correction coefficient data table stores correction coefficient data for a target rotation number. A correction coefficient data extraction unit extracts correction coefficient data in accordance with an elapsed time of the zero-cross point signal generated by the zero-cross detection unit from a rotation number correction coefficient data table, and outputs the data to a corrected rotation number creation unit. The corrected rotation number creation unit corrects the rotation number set by the rotation number setting unit in accordance with the extracted correction coefficient data, and outputs the corrected rotation number to a sine wave data creation unit.

5 Claims, 10 Drawing Sheets

| ELAPSED TIME [ms] | ROTATION NUMBER CORRECTION COEFFICIENT [%] |
|---|---|
| 0.0 | -31.83 |
| 0.2 | -28.69 |
| 0.4 | -25.56 |
| 0.6 | -22.46 |
| 0.8 | -19.40 |
| 1.0 | -16.38 |
| 1.2 | -13.42 |
| 1.4 | -10.54 |
| 1.6 | -7.74 |
| 1.8 | -5.04 |
| 2.0 | -2.44 |
| 2.2 | 0.04 |
| 2.4 | 2.40 |
| 2.6 | 4.62 |
| 2.8 | 6.69 |
| 3.0 | 8.62 |
| 3.2 | 10.39 |
| 3.4 | 11.98 |
| 3.6 | 13.41 |
| 3.8 | 14.66 |
| 4.0 | 15.72 |
| 4.2 | 16.60 |
| 4.4 | 17.28 |
| 4.6 | 17.77 |
| 4.8 | 18.07 |
| 5.0 | 18.17 |
| 5.2 | 18.07 |
| 5.4 | 17.77 |
| 5.6 | 17.28 |
| 5.8 | 16.60 |
| 6.0 | 15.72 |
| 6.2 | 14.66 |
| 6.4 | 13.41 |
| 6.6 | 11.98 |
| 6.8 | 10.39 |
| 7.0 | 8.62 |
| 7.2 | 6.69 |
| 7.4 | 4.62 |
| 7.6 | 2.40 |
| 7.8 | 0.04 |
| 8.0 | -2.44 |
| 8.2 | -5.04 |
| 8.4 | -7.74 |
| 8.6 | -10.54 |
| 8.8 | -13.42 |
| 9.0 | -16.38 |
| 9.2 | -19.40 |
| 9.4 | -22.46 |
| 9.6 | -25.56 |
| 9.8 | -28.69 |

| ELAPSED TIME [ms] | ROTATION NUMBER CORRECTION COEFFICIENT [%] | | | | |
|---|---|---|---|---|---|
| | BELOW 2000 rpm | 2000 rpm – 2700 rpm | 2700 rpm – 3300 rpm | 3300 rpm – 4000 rpm | 4000 rpm AND ABOVE |
| 0.0 | -6.37 | -19.10 | -31.83 | -19.10 | -6.37 |
| 0.2 | -5.74 | -17.21 | -28.69 | -17.21 | -5.74 |
| 0.4 | -5.11 | -15.34 | -25.56 | -15.34 | -5.11 |
| 0.6 | -4.49 | -13.48 | -22.46 | -13.48 | -4.49 |
| 0.8 | -3.88 | -11.64 | -19.40 | -11.64 | -3.88 |
| 1.0 | -3.28 | -9.83 | -16.38 | -9.83 | -3.28 |
| 1.2 | -2.68 | -8.05 | -13.42 | -8.05 | -2.68 |
| 1.4 | -2.11 | -6.33 | -10.54 | -6.33 | -2.11 |
| 1.6 | -1.55 | -4.65 | -7.74 | -4.65 | -1.55 |
| 1.8 | -1.01 | -3.02 | -5.04 | -3.02 | -1.01 |
| 2.0 | -0.49 | -1.47 | -2.44 | -1.47 | -0.49 |
| 2.2 | 0.01 | 0.02 | 0.04 | 0.02 | 0.01 |
| 2.4 | 0.48 | 1.44 | 2.40 | 1.44 | 0.48 |
| 2.6 | 0.92 | 2.77 | 4.62 | 2.77 | 0.92 |
| 2.8 | 1.34 | 4.02 | 6.69 | 4.02 | 1.34 |
| 3.0 | 1.72 | 5.17 | 8.62 | 5.17 | 1.72 |
| 3.2 | 2.08 | 6.23 | 10.39 | 6.23 | 2.08 |
| 3.4 | 2.40 | 7.19 | 11.98 | 7.19 | 2.40 |
| 3.6 | 2.68 | 8.05 | 13.41 | 8.05 | 2.68 |
| 3.8 | 2.93 | 8.79 | 14.66 | 8.79 | 2.93 |
| 4.0 | 3.14 | 9.43 | 15.72 | 9.43 | 3.14 |
| 4.2 | 3.32 | 9.96 | 16.60 | 9.96 | 3.32 |
| 4.4 | 3.46 | 10.37 | 17.28 | 10.37 | 3.46 |
| 4.6 | 3.55 | 10.66 | 17.77 | 10.66 | 3.55 |
| 4.8 | 3.61 | 10.84 | 18.07 | 10.84 | 3.61 |
| 5.0 | 3.63 | 10.90 | 18.17 | 10.90 | 3.63 |
| 5.2 | 3.61 | 10.84 | 18.07 | 10.84 | 3.61 |
| 5.4 | 3.55 | 10.66 | 17.77 | 10.66 | 3.55 |
| 5.6 | 3.46 | 10.37 | 17.28 | 10.37 | 3.46 |
| 5.8 | 3.32 | 9.96 | 16.60 | 9.96 | 3.32 |
| 6.0 | 3.14 | 9.43 | 15.72 | 9.43 | 3.14 |
| 6.2 | 2.93 | 8.79 | 14.66 | 8.79 | 2.93 |
| 6.4 | 2.68 | 8.05 | 13.41 | 8.05 | 2.68 |
| 6.6 | 2.40 | 7.19 | 11.98 | 7.19 | 2.40 |
| 6.8 | 2.08 | 6.23 | 10.39 | 6.23 | 2.08 |
| 7.0 | 1.72 | 5.17 | 8.62 | 5.17 | 1.72 |
| 7.2 | 1.34 | 4.02 | 6.69 | 4.02 | 1.34 |
| 7.4 | 0.92 | 2.77 | 4.62 | 2.77 | 0.92 |
| 7.6 | 0.48 | 1.44 | 2.40 | 1.44 | 0.48 |
| 7.8 | 0.01 | 0.02 | 0.04 | 0.02 | 0.01 |
| 8.0 | -0.49 | -1.47 | -2.44 | -1.47 | -0.49 |
| 8.2 | -1.01 | -3.02 | -5.04 | -3.02 | -1.01 |
| 8.4 | -1.55 | -4.65 | -7.74 | -4.65 | -1.55 |
| 8.6 | -2.11 | -6.33 | -10.54 | -6.33 | -2.11 |
| 8.8 | -2.68 | -8.05 | -13.42 | -8.05 | -2.68 |
| 9.0 | -3.28 | -9.83 | -16.38 | -9.83 | -3.28 |
| 9.2 | -3.88 | -11.64 | -19.40 | -11.64 | -3.88 |
| 9.4 | -4.49 | -13.48 | -22.46 | -13.48 | -4.49 |
| 9.6 | -5.11 | -15.34 | -25.56 | -15.34 | -5.11 |
| 9.8 | -5.74 | -17.21 | -28.69 | -17.21 | -5.74 |

MOTOR CONTROL DEVICE

TECHNICAL FIELD

The present invention relates to a motor control device, and for example, a motor control device that can drive a synchronous motor having coils of a plurality of phases without using a sensor.

BACKGROUND ART

In the case of driving a synchronous motor having coils of a plurality of phases, it is conventionally important to optimize so-called conduction timing of flowing a motor current with suitable timing to a motor rotor and applying a voltage to a coil terminal. To detect a reference for this conduction timing, there are various systems, such as a system of detecting a back electromotive voltage, a system of detecting a zero-cross current phase, and the like.

For example, in so-called sensorless driving of controlling and driving a motor without using a motor rotor position sensor, there is a system of, when bringing a motor coil into conduction, detecting a back electromotive voltage generated in the motor coil by rotation of the motor, from a motor coil terminal.

In addition, in a driving device shown in Japanese Patent Laying-Open No. 5-236789 (Patent Literature 1), a system of detecting a motor voltage phase at the time of motor current zero crossing, detecting a motor current phase based on this voltage phase, and calculating a voltage command or a frequency command such that this motor current phase is a desired current phase is shown.

Figure 10:
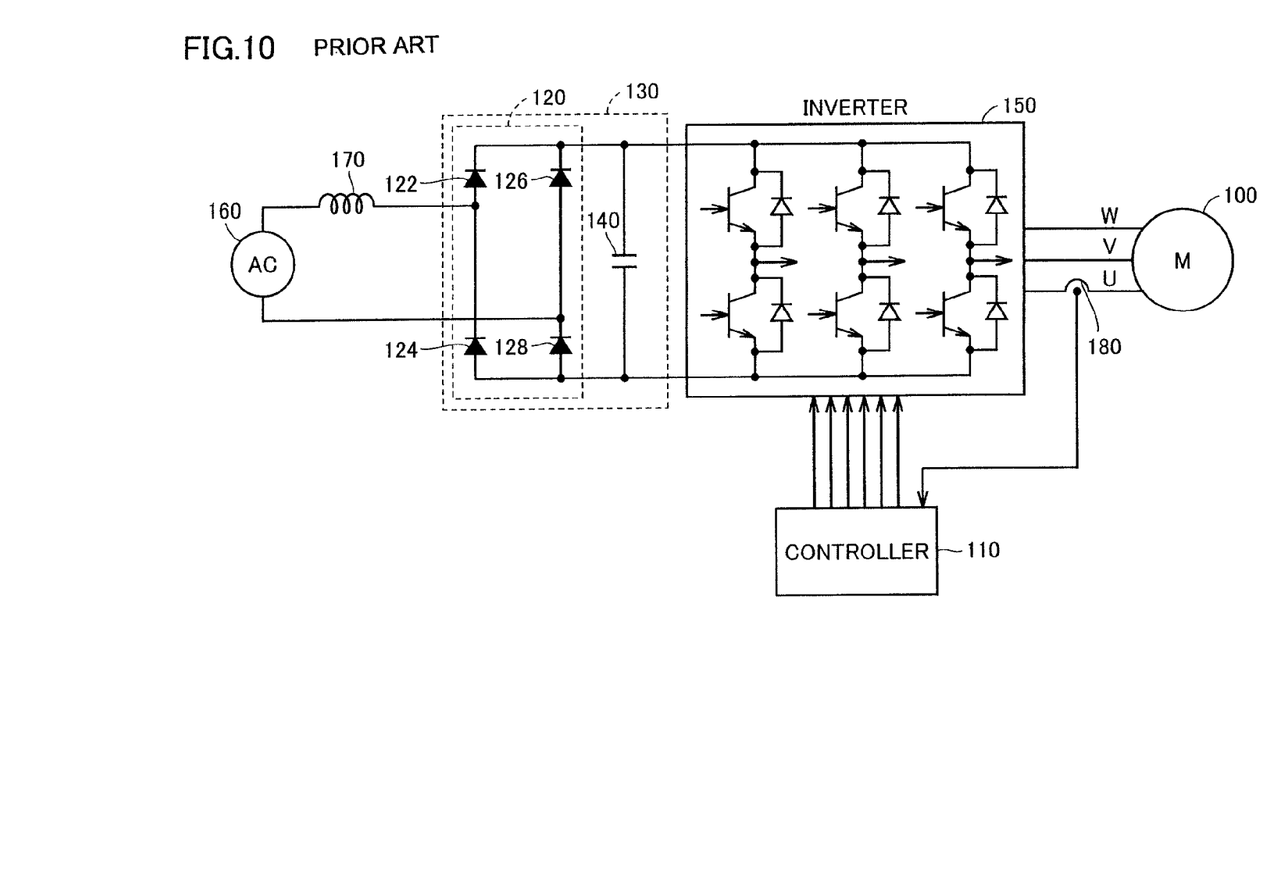
FIG. 10 is a configuration of a conventional typical motor control device.

FIG. 10 shows a configuration of a conventional typical motor control device.

Referring to FIG. 10, to drive a synchronous motor 100 having coils of a plurality of phases (three phases) in a stator and a permanent magnet in a rotor, an inverter device is formed of an inverter 150, a converter circuit 130, an AC power supply 160, a coil 170, a current sensor 180, and a controller 110. It is noted that, in this example, AC power supply 160 shall be 200V and 50 Hz.

Synchronous motor 100 is driven by inverter 150, and inverter 150 is supplied by converter circuit 130 with a DC voltage obtained by converting AC power supply 160 into a direct current.

Specifically, converter circuit 130 includes a diode full wave rectifying circuit 120 formed of diodes 122 to 128 and a smoothing capacitor 140 across buses, and the capacity of the smoothing capacitor is large enough to such a degree that a ripple in a DC voltage waveform can be suppressed.

An AC voltage of AC power supply 160 is converted by this converter circuit 130 into a DC voltage for supply to inverter 150.

Coil 170 is provided for the purpose of improving the power factor of the AC power supply supplied to converter circuit 130.

Figure 11:
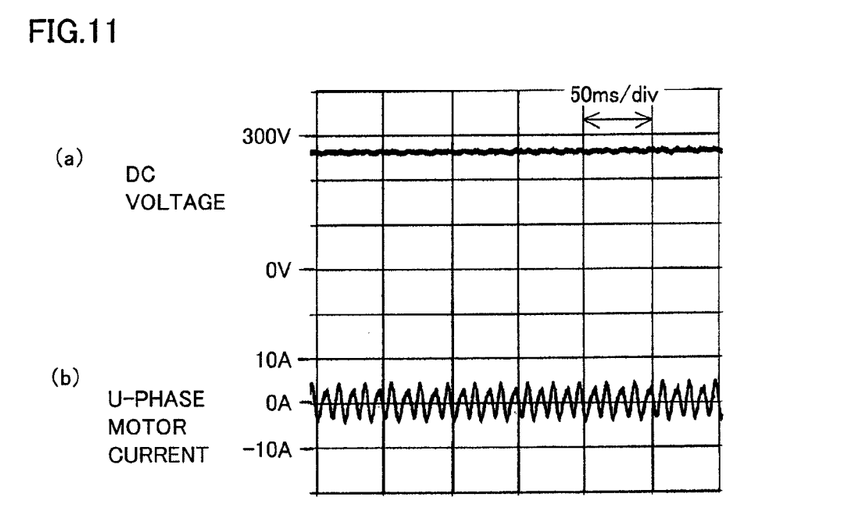
FIG. 11 is a drawing for explaining the relation between a DC voltage waveform and a U-phase motor current.

FIG. 11 is a drawing for explaining the relation between DC voltage waveform and U-phase motor current.

As shown in FIG. 11(a), when the capacity of smoothing capacitor 140 is large enough, the ripple in the DC voltage waveform is suppressed, and a constant DC voltage is supplied to inverter 150.

FIG. 11(b) is a drawing for explaining a U-phase motor current waveform detected by current sensor 180.

Since the ripple in the DC voltage waveform is suppressed and a constant DC voltage is supplied to inverter 150 as shown in FIG. 11(b), the U-phase motor current that drives synchronous motor 100 from inverter 150 is detected as a stable waveform of constant amplitude.

On the other hand, since a conventional configuration as described above is disadvantageous in that an improved input current waveform and a higher power factor are less likely to be achieved, Japanese Patent Laying-Open No. 2002-51589 (Patent Literature 2) proposes a system without using coil 170 but with a capacitor, having a small capacity of about $1/100$ of the capacity of a conventional smoothing capacitor, provided across buses of an inverter to intentionally cause a ripple of a frequency twice that of the power supply to occur in a DC voltage, thereby achieving an improved input current waveform and a higher power factor with a simple system.

CITATION LIST

Patent Literature

PTL 1: Japanese Patent Laying-Open No. 5-236789
PTL 2: Japanese Patent Laying-Open No. 2002-51589

SUMMARY OF INVENTION

Technical Problem

Figure 12:
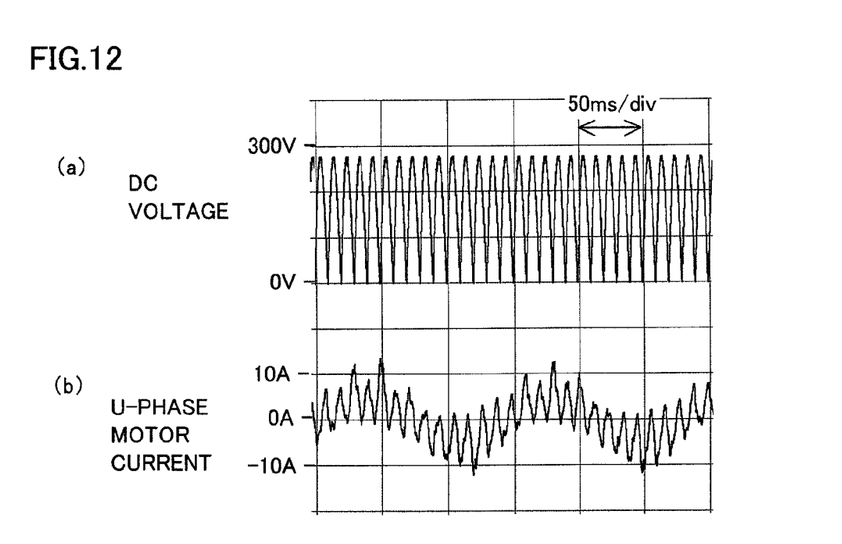
FIG. 12 is another drawing explaining the relation between a DC voltage waveform and a U-phase motor current.

However, when the above-described system is adopted, a ripple of a frequency twice that of the power supply occurs in the DC voltage as shown in FIG. 12(a), because there is no coil 170 provided which suppresses a ripple in the DC voltage waveform. That is, since AC power supply 160 is 200V and 50 Hz, a 100-Hz ripple occurs.

Here, since the motor is a quadrupole motor, an output frequency of the inverter when the motor rotation number is 2800 rpm is 93.3 Hz. In this manner, as the inverter frequency approaches the frequency of the ripple in the DC voltage, a great ripple occurs in the motor current at the inverter output side as shown in FIG. 12(b), making the motor rotation unstable. This increases vibration and noise and deteriorates efficiency, and at worst, results in step-out stop.

The present invention was made to solve the above-described problems, and provides a motor control device capable of performing position-sensorless sine wave conduction that secures stability even in the case of a great ripple in a DC voltage.

Solution to Problem

A motor control device according to an aspect of the present invention includes a rectifying circuit having a single-phase AC power supply as an input, an inverter connected to the rectifying circuit and converting DC power obtained in the rectifying circuit into three-phase AC power to drive a motor, a control device controlling the inverter, and a zero-cross point detection unit detecting a zero-cross point of the single-phase AC power supply. The control device includes rotation number setting means setting a rotation number of the motor, and rotation number correction means correcting the rotation number of the motor set by the rotation number setting means in accordance with an elapsed time since detection of the zero-cross point by the zero-cross point detection unit.

Preferably, an extremely small-capacity capacitor is connected across buses of the inverter.

Preferably, the rotation number correction means corrects a target rotation number based on a correction coefficient of a correction coefficient data table previously defined in accordance with the elapsed time since detection of the zero-cross point.

Particularly, the correction coefficient is defined as a value such that a total of correction coefficients defined in the correction coefficient data table for the target rotation number is approximately zero.

Particularly, the correction coefficient data table is provided for each target rotation number.

Advantageous Effects of Invention

The motor control device of the present invention is provided with rotation number correction means correcting a rotation number of a motor set by rotation number setting means in accordance with an elapsed time since detection of a zero-cross point by a zero-cross point detection circuit. With this configuration, the rotation number of the motor is corrected in accordance with the elapsed time since detection of a zero-cross point. By correcting the rotation number at the time when the DC voltage drops to 0V, which presents a zero-cross point, to be a value considerably distant from the frequency of a ripple in the DC voltage, a ripple in the current waveform can be suppressed, and a stable waveform of constant amplitude can be detected, so that a synchronous motor can be driven stably.

BRIEF DESCRIPTION OF DRAWINGS

FIG. 9 is a drawing explaining a data table for a plurality of rotation number correction coefficients that can be varied in accordance with a rotation number command value (a pre-correction rotation number) of a motor.

DESCRIPTION OF EMBODIMENTS

Hereinafter, an embodiment of the present invention will be described with reference to the drawings. In the following description, the same parts have the same reference characters allotted. They are named and function identically. Therefore, detailed description thereof will not be repeated.

Using FIG. 1, a block diagram of a motor control device according to an embodiment of the present invention will be explained.

Figure 1:
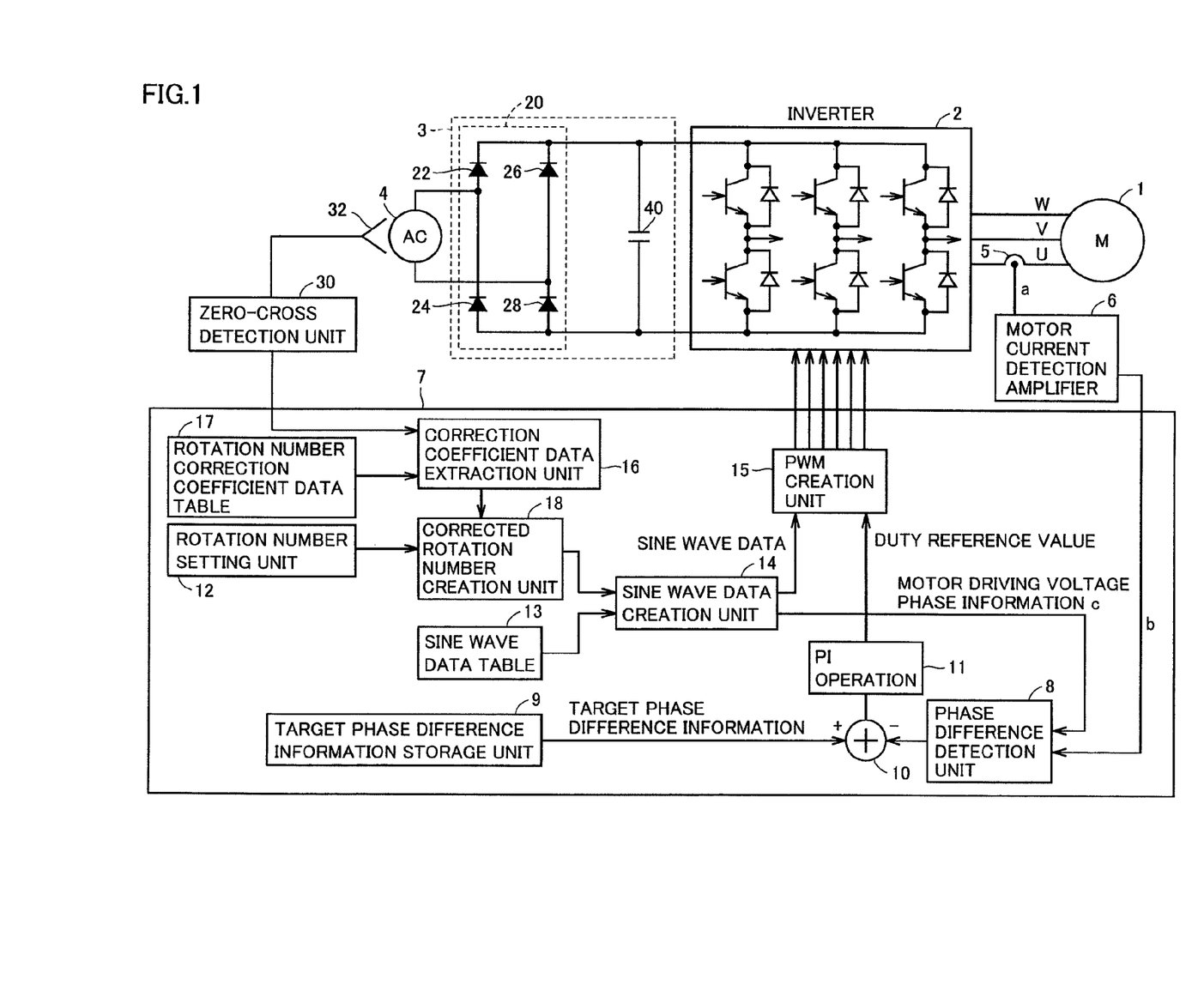
FIG. 1 is a drawing explaining a block diagram of a motor control device according to an embodiment of the present invention.

Referring to FIG. 1, the motor control device is formed of a synchronous motor 1 having coils of a plurality of phases (three phases) in a stator and a permanent magnet in a rotor, an inverter 2, a converter circuit 3, an AC power supply 4, a current sensor 5, a motor current detection amplifier 6, a zero-cross detection unit 30, a voltage sensor 32, and a controller 7 as a microcomputer.

Synchronous motor 1 is driven by inverter 2, and inverter 2 is supplied with a direct current obtained by converting an AC voltage of AC power supply 4 from converter circuit 3.

Specifically, converter circuit 3 includes a plurality of diodes 22 to 28, constituting a full wave rectifying circuit 20. Moreover, a small-capacity capacitor 40 is provided across buses. In this example, a capacitor smaller than or equal to 100 μF shall be used as small-capacity capacitor 40. Specifically, a capacitor of about 10 to 20 μF can be used in consideration of prevention of breakdown voltage of semiconductor elements of inverter 2 due to regeneration energy of synchronous motor 1 at the load side.

Current sensor 5 detects a motor current a flowing through a specific phase (U phase in FIG. 1) among respective U, V and W phases of motor coil terminals. The motor current detected by current sensor 5 is supplied to motor current detection amplifier 6.

Then, a motor current signal b amplified by a predetermined quantity and then subjected to offset addition in motor current detection amplifier 6 is supplied to controller 7.

Moreover, voltage sensor 32 detects a voltage of AC power supply 4. The AC voltage detected by voltage sensor 32 is supplied to zero-cross detection unit 30.

Then, zero-cross detection unit 30 monitors the AC voltage detected by voltage sensor 32, generates a zero-cross point signal when the voltage crosses 0V, and supplies the signal to controller 7.

Controller 7 implements each processing of a phase difference detection unit 8, a target phase difference information storage unit 9, an addition unit 10, a PI operation unit 11, a rotation number setting unit 12, a sine wave data table 13, a sine wave data creation unit 14, a PWM creation unit 15, a correction coefficient data extraction unit 16, and a rotation number correction coefficient data table 17 by software. In this example, phase control is executed with a system similar to a phase control system described in Japanese Patent Laying-Open No. 2001-112287. This will be described later.

Phase difference detection unit 8 A/D converts and captures the motor current signal supplied from motor current detection amplifier 6 with a predetermined timing, integrates respective pieces of current sampled data sampled in two motor driving voltage phase periods to obtain motor current signal areas, and outputs an area ratio between both the motor current signal areas as phase difference information.

Target phase difference information is stored in target phase difference information storage unit 9. Data on an error between target phase difference information and phase difference information is calculated by addition unit 10. PI operation unit 11 calculates proportional error data and integral error data for the calculated error data, and outputs a duty reference value. It is noted that addition unit 10 and PI operation unit 11 constitute a phase difference control unit.

Rotation number setting unit 12 sets a rotation number command as a target of synchronous motor 1, and sine wave data table 13 includes a table containing a predetermined pieces of data.

Rotation number correction coefficient data table 17 stores correction coefficient data for target rotation numbers.

Correction coefficient data extraction unit 16 extracts, from the rotation number correction coefficient data table, correction coefficient data in accordance with an elapsed time of a zero-cross point signal generated by zero-cross detection unit 30, and outputs the data to corrected rotation number creation unit 18.

Corrected rotation number creation unit 18 corrects the rotation number set by rotation number setting unit 12 in accordance with the correction coefficient data extracted by correction coefficient data extraction unit 16 for output to sine wave data creation unit 14.

Sine wave data creation unit 14 reads sine wave data corresponding to each of U, V and W phases of motor coil terminals from sine wave data table 13 in accordance with the rotation number command output from corrected rotation number creation unit 18 and a time progress, and outputs motor driving voltage phase information c of the U phase from the sine wave data of the U phase.

PWM creation unit 15 outputs a PWM waveform to the driving elements of inverter 2 for each phase based on the sine wave data and the duty reference value.

It is noted that current sensor 5 may be a so-called current sensor formed of a coil and a Hall element, or a current transformer.

Moreover, although this example describes the case of detection for the U phase, higher accuracy can be achieved by detecting the motor current of not only a single phase but also each phase. Further, creation of sine wave data may be made by an operation, rather than based on sine wave data table 13.

Furthermore, although the components of respective components 8 to 17 have been described as being processed by controller 7 by software, this is not a limitation, and may be implemented by a hardware configuration as long as similar processing is performed.

It is noted that the configuration for the case where the motor driving waveform is a sine wave has been described. Vibration and noise can be reduced since a smooth motor current can be supplied by using the sine waveform. However, this is not a limitation, and more efficient driving will be possible if applying a driving waveform with which a motor current matching the magnetic flux of a motor rotor can be obtained.

An area ratio between two motor current signal areas detected in two motor driving voltage phase periods is calculated in phase difference detection unit 8, and this result is used as phase difference information. A PI operation is performed in PI operation unit 11 on an error amount between this phase difference information and target phase difference information. PWM creation unit 15 calculates an output duty ratio each time based on a duty reference value which is an output of the PI operation unit and sine wave data separately obtained from a rotation command, to thereby generate a PWM signal, and applies the signal to a motor coil through inverter 2, so that synchronous motor 1 is driven.

That is, the magnitude of driving voltage (duty width of PWM duty) is determined by a phase difference control feedback loop for controlling a motor current phase difference relative to a motor driving voltage (output duty) constant, and the rotation number is determined by sine wave data output at a desired frequency so as to rotate synchronous motor 1 at a desired rotation number. The motor can thereby be driven and controlled at a desired phase difference and a desired rotation number.

It is noted that, at start-up of the motor, each phase is forced to conduct, a rotating field is applied, and the motor is forcedly excited, while in normal driving, control may be performed by the above-described method.

Here, that the synchronous motor can be driven and controlled by the phase difference control according to the present invention is as described in Japanese Patent Laying-Open No. 2001-112287.

In the present embodiment, processing of detection of phase difference information according to the present invention will be explained first as an example for the system of the above-described phase difference control.

Using FIG. 2, the principle of phase difference information detection will be described.

Figure 2:
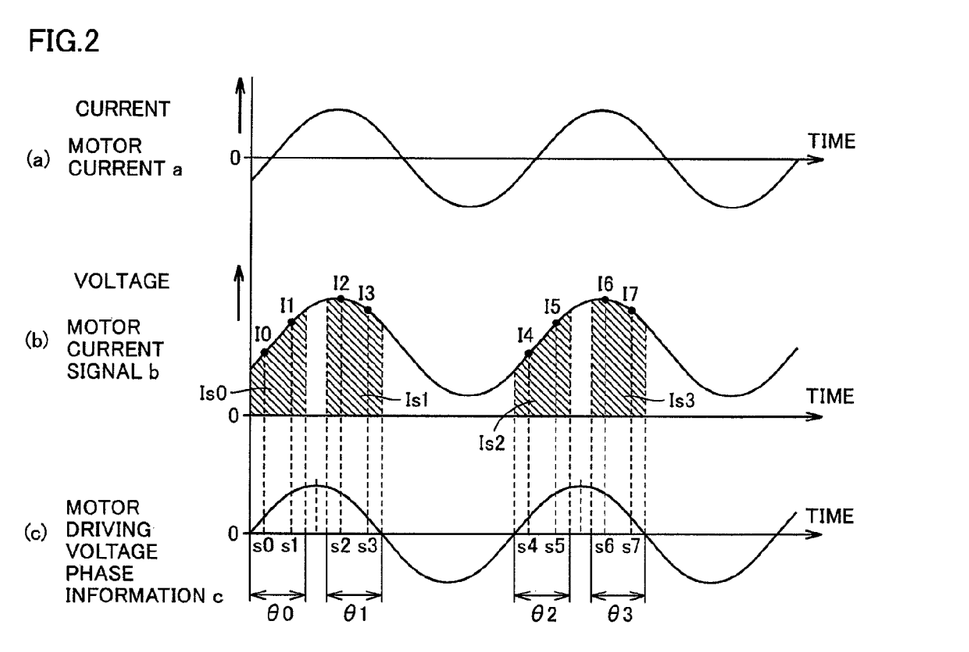
FIG. 2 is a drawing explaining the principle of phase difference information detection.

Referring to FIG. 2(*a*), a motor current a in the U phase shall have a waveform of substantially a sine wave centered on the zero level. This motor current a is amplified by motor current detection amplifier 6, and subjected to offset setting to generate a motor current signal b. This is performed for causing motor current a to match a convertible voltage range (e.g., 0 to +5V) of an A/D converter built in controller 7.

Moreover, motor driving voltage phase information c of the U phase is created by sine wave data creation unit 14 based on sine wave data of the U phase. It is noted that motor driving voltage phase information c does not actually need to have a sine waveform, but phase information should only be known.

Motor current signal b as shown in FIG. 2(*b*) and motor driving voltage phase information c shown in FIG. 2(*c*) are input to phase difference detection unit 8. Phase difference detection unit 8 samples motor current signal b in predetermined phase periods θ0 and θ1 previously determined based on motor driving voltage phase information c, in predetermined sampling phases (sampling timing) s0 to s3 n times (twice in the case of FIG. 2) per phase period, and each sampling is performed to integrate current sampled data, representing the motor current signal areas in respective phase periods θ0 and θ1 as IS0 and IS1, respectively.

That is, $$Is0 = I0 + I1$$

$$Is1 = I2 + I3$$

Then, the ratio between respective motor current signal areas Is0 and Is1 is calculated, and this is used as phase difference information.

Figure 3:
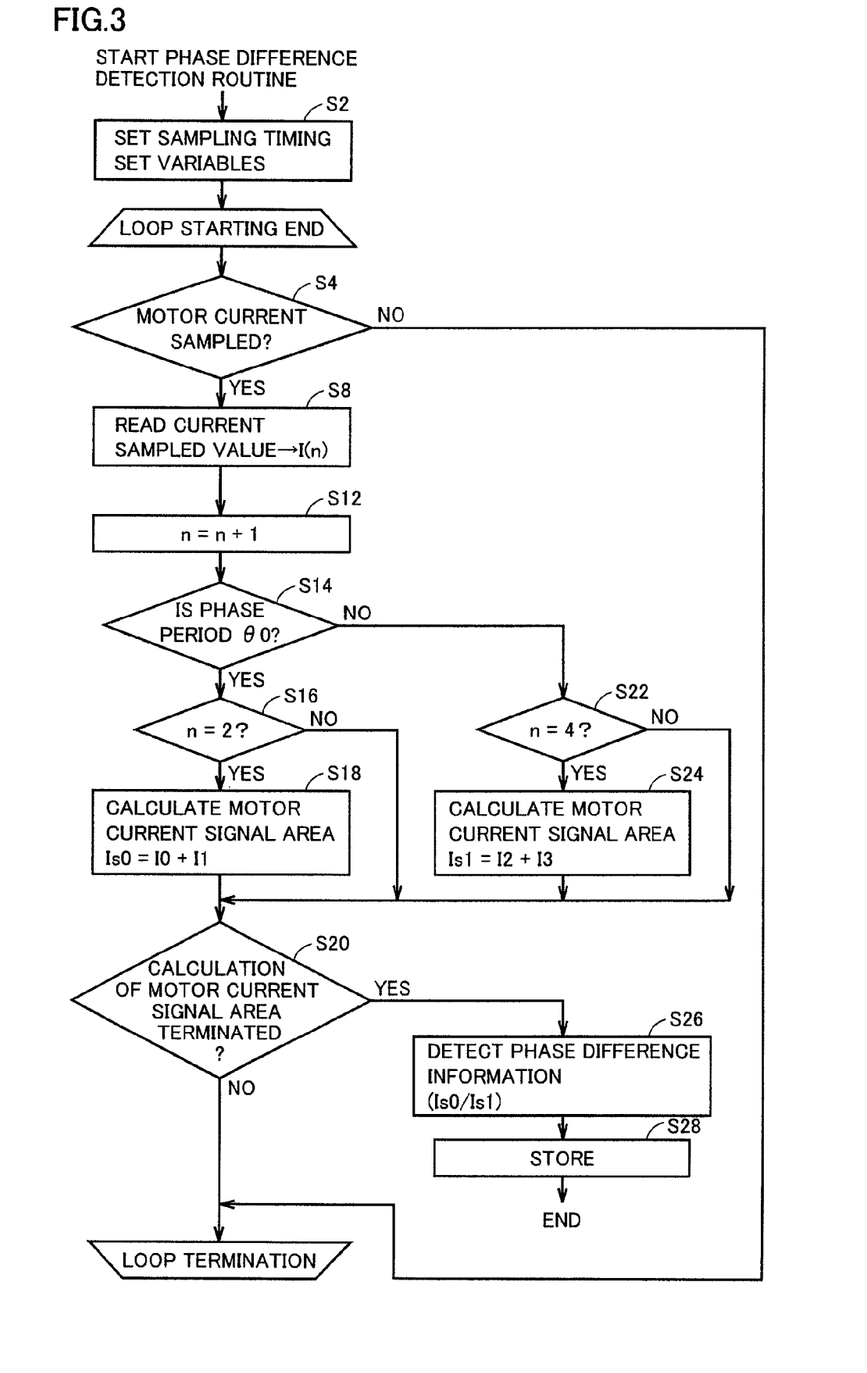
FIG. 3 is a flow chart explaining a phase difference detection routine of detecting phase difference information in a controller 7.

FIG. 3 is a flow chart explaining a phase difference detection routine of detecting phase difference information in controller 7.

FIG. 3 is a flow chart explaining a sampling start routine (timer interrupt routine) of detecting whether a sampling timing has come based on a timer value or the like to start sampling. It is noted that the processing configuration is not particularly limited as such, but processing should only be performed in a similar way of thinking.

Referring to FIG. 3, in Step S2, as to the sampling timing in sampling phase s0, an interrupt value of the sampling start routine is set based on the rotation number of the motor and the count cycle of the timer, and each variable such as the number of times of sampling n is initialized. These are performed only once immediately after the start of motor rotation, or immediately after phase period θ0, or before phase period θ0, and subsequent sampling timing setting is performed in the sampling start routine.

Processing after Step S4 is loop processing, and after Step S2 is performed, this loop processing is repeated until detection of phase difference information is terminated, and loop processing is performed again in the next phase period θ0. In Step S4, whether sampling commanded to be started by the sampling start routine has been terminated is detected in phase difference detection unit 8. If it has been terminated, the process advances to Step S8, and if it has not been terminated, the following processing will be performed, however, whether the sampling has been terminated will be detected continuously as a result because the loop processing is being performed.

Then, next, a current sampled value is read (Step S8). Specifically, phase difference detection unit 8 reads a current sampled value output from motor current detection amplifier 6.

Then, next, the number of times of sampling is updated once in Step S12. Specifically, subsequent processing is executed in phase difference detection unit 8.

Next, in Step S14, it is determined whether the present phase period is θ0 or θ1, and processing of Step S16 or S22 is performed depending on the result of determination. This determination may be performed by the number of times of sampling n.

In Step S16 or S22, it is determined whether the number of times of sampling has reached a predetermined number of times (twice or four times), and if it has reached the predetermined number of times (twice or four times), processing of Step S18 or S24 is performed.

In Step S18 or S24, assuming that sampling in each phase period has been terminated, current sampled data is integrated (I0+I1, I2+I3), and a motor current signal area Is0 or Is1 is calculated. In Step S20, it is determined whether calculation of both motor current signal area Is0 and Is1 has been terminated, and if it has not been terminated, the process is returned to the loop processing.

In Step S26, assuming that calculation of motor current signal areas Is0 and Is1 has been terminated, the ratio between both pieces of area data (Is0/Is1) is calculated, and this is used as phase difference information.

Then, next, the detected phase difference information is stored (Step S28). Then, the sequential phase difference detection routine (loop processing) is terminated.

On the other hand, when it has been determined in Step S6 that the motor voltage is less than a predetermined voltage (NO in Step S6), then, the current sampled value is invalidated (Step S9). Then, processing of the phase difference detection routine is terminated. When the motor voltage is less than the predetermined voltage, the motor current has a small amplitude, and is thus greatly affected by an error. Since highly accurate phase control is thus difficult with phase difference information using the sampled value of motor current significantly affected by an error, and therefore, processing of the phase difference detection routine is terminated. In this case, phase control will be executed based on the stored phase difference information. That is, the phase difference information will not be updated, and phase control based on phase difference information updated when the motor voltage is more than or equal to the predetermined voltage will be executed in the next phase difference detection routine.

Figure 4:
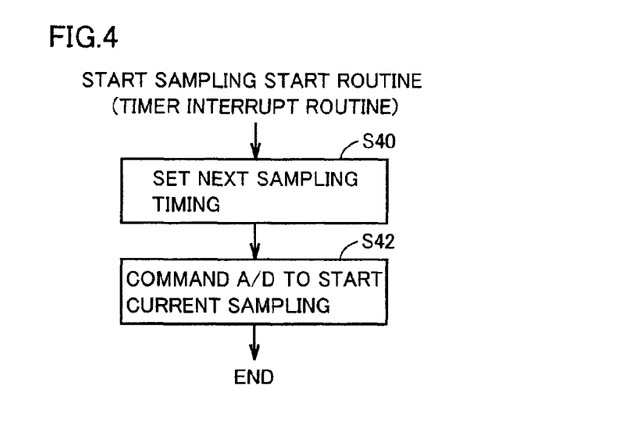
FIG. 4 is a flow chart explaining a sampling start routine of detecting whether a sampling timing has come based on a value of a timer or the like to start sampling.

Moreover, processing of the sampling start routine (timer interrupt routine) shown in FIG. 4 is started with the sampling timing with the timer interruption set. In Step S40, the next sampling timing is set as an interrupt value in the sampling start routine in accordance with a sampling phase previously determined.

In Step S42, the A/D converter is commanded to start current sampling, and the process will be terminated.

In this manner, the reason why the next sampling timing is set during the processing of the sampling start routine is because the timer count value at this time is known (≈the present timer interrupt value) and the motor voltage phase at this time is known (≈the present sampling phase). This avoids the need to refer to the timer count value and the motor voltage phase again, which enables efficient processing.

However, strictly saying, the present timer interrupt value and the present sampling phase are values when an interruption occurs, and slightly differ from the timer count value and the motor voltage phase when Step S40 is performed. Therefore, if strict sampling timing setting is necessary, it is desirable to refer to the timer count value and the motor voltage phase each time.

Here, the sampling timing of motor current can be arbitrarily determined by setting the timer interrupt value at a predetermined value each time based on the motor rotation number and the timer cycle in accordance with a sampling phase previously determined. In this setting method, specifically, it is assumed that the motor makes one rotation in two cycles of sine wave and the motor rotation number is 3000 rpm. Sampling is started when the motor voltage phase is 30°. Then, setting is performed when the motor voltage phase is 0°. Assuming that a current sampling timer has a count resolution of 1 μsec, since one cycle of sine wave is 10 msec, a time to be taken until the motor voltage phase reaches 30° from 0° will be as follows:

$$0.01\,[s]*30[°]/360[°]=833\,[\mu sec]$$

Counts of the current sampling timer will be as follows:

$$833\,[\mu sec]/1\,[\mu sec/count]=833\,[counts]$$

That is, if 833 is added to the timer count value when the motor voltage phase is 0° and if this is used as a timer interrupt value, a timer interruption occurs when the motor voltage phase is 30°, and current sampling is started. It is noted that, since the motor rotation number shall be determined by the cycle of sine wave data as mentioned above, that is, determined at the side of controller 7, sampling in a correct motor voltage phase is possible.

As to how the sampling timing in two phase periods is set, there is no problem if each sampling timing is such timing that sampling is performed always in the same phase of the motor voltage and that one rotor stator relative position or driving voltage (output duty) is obtained for one piece of phase difference information.

However, as shown in FIG. 2, phase difference control design will be facilitated if current sampling in each phase period is performed in such a phase that is line-symmetric about the motor voltage phase of 90° (such that a phase from the 90° phase to each sampling timing is identical with the sampling timing in each phase period, in other words, such that both motor current signal areas are detected as identical values when an actual phase difference is zero).

Further, the respective phase periods of motor voltage phase do not need to be continuous, and in FIG. 2, for example, division may be made such that an integrated value of I0 and I5 is a motor current signal area in a first phase period and an integrated value of I2 and I7 is a motor current signal area in a second phase period. These may be determined from an allowance of processing time of a control system, and the like.

As to phase difference detection after detection of the phase difference information in phase periods θ0 and θ1 (Is0/Is1), higher speed detection of phase difference information is made possible by calculating phase difference information (Is2/Is1) using phase periods θ1 and θ2.

A method of simplifying setting of sampling timing of motor current, that is, setting of a timer interrupt value will now be described.

Figure 5:
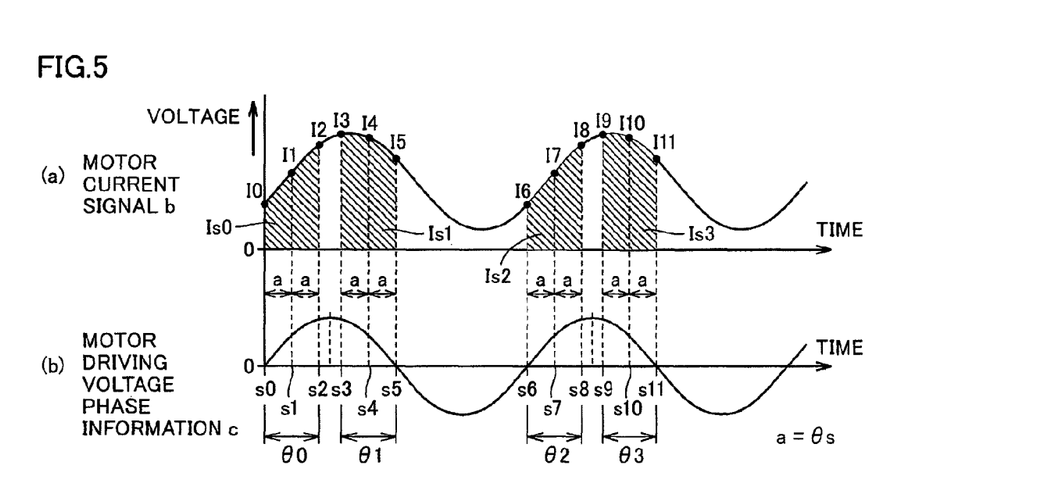
FIG. 5 is a waveform diagram of a motor current signal b and motor driving voltage phase information c.

FIG. 5 is a waveform diagram of motor current signal b and motor driving voltage phase information c.

In FIG. 5, the number of times of sampling in each of predetermined phase periods θ0 and θ1 based on motor driving voltage phase information c shall be three. It should be noted here that the current sampling timing in each phase period shall be a sampling period of the same value, θs=a, that is, sampling is performed at regular intervals.

After calculating θs at the beginning of each phase period in accordance with the aforementioned method of setting the sampling timing, θs should only be added to the timer count value at this time, at a subsequent timer interrupt value.

With such constant timing, sampling timing setting in Step S40 of FIG. 4, that is, calculation of a timer interrupt value, can be facilitated.

As described above, in the present embodiment, a great ripple may occur in the DC voltage as described with reference to FIG. 12(a).

Accordingly, as described with reference to FIG. 12(b), a great ripple may occur in the motor current at the inverter output side, and specifically, the U-phase motor current may have a current value that falls outside the limits of −10 A to 10 A, so that phase difference control could be unstable. Therefore, motor rotation becomes unstable, which could increase vibration and noise and degrade efficiency.

In the present embodiment, a system for correcting the rotation number for suppressing a ripple in the motor current at the inverter output side in order to solve the above-described issues will be described.

Using FIG. 6, a system for correcting the rotation number of the motor control device according to the embodiment of the present invention will be described.

Figure 6:
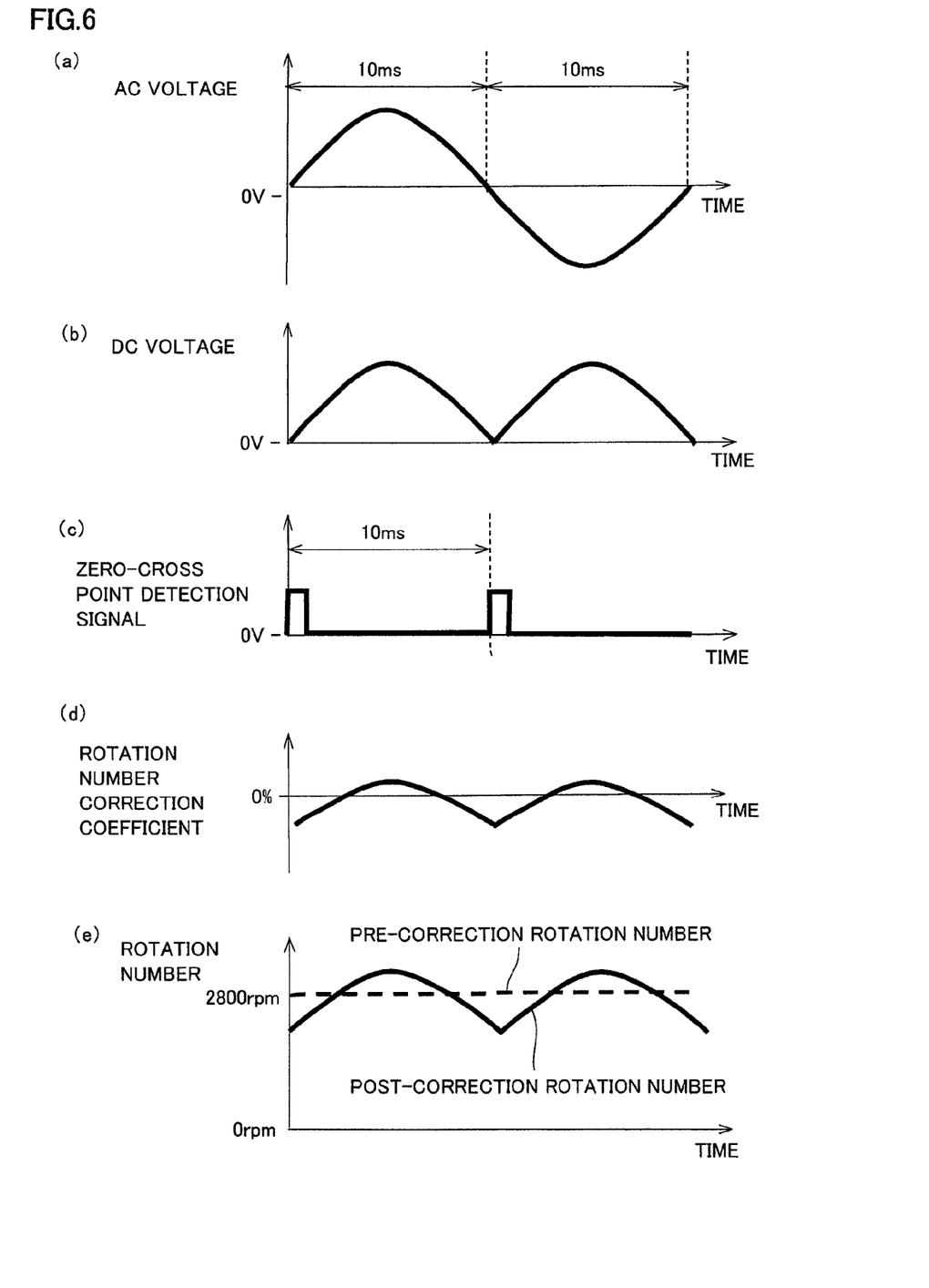
FIG. 6 is a drawing explaining a system of correcting a rotation number of the motor control device according to the embodiment of the present invention.

Referring to FIG. 6(a), an AC voltage waveform is shown here. It is noted that AC power supply 4 is 200V and has a frequency of 50 Hz. A rotation number command value (pre-correction rotation number) of the motor shall be 2800 rpm. An output frequency of the inverter in the case where the rotation number command value (pre-correction rotation number) of the motor is 2800 rpm is 93.3 Hz, since the motor is a quadrupole motor.

FIG. 6(b) shows a DC voltage waveform relative to the AC voltage waveform of FIG. 6(a). Since the capacity of the smoothing capacitor is sufficiently small in this example, a great ripple has occurred in the DC voltage waveform. That is, a ripple of 100-Hz frequency twice the frequency of the AC power supply occurs.

FIG. 6(c) shows a zero-cross point signal relative to the AC voltage waveform of FIG. 6(a). Specifically, zero-cross detection unit 30 monitors AC power supply 4, and outputs a zero-cross point signal when the AC voltage crosses zero in the AC voltage waveform.

In the present embodiment, assuming the time point when the rising edge of this zero-cross point signal occurs to be zero, the elapsed time from this time point is measured by controller 7 as a microcomputer.

Correction coefficient data extraction unit 16 reads rotation number correction coefficient data table 17 to extract correction coefficient data in accordance with this lapse of time. Then, the extracted correction coefficient data is output to corrected rotation number creation unit 18.

Corrected rotation number creation unit 18 outputs, to sine wave data creation unit 14, a value calculated by multiplying the target rotation number set in rotation number setting unit 12 by the correction coefficient data, as a corrected target rotation number.

Figure 7:
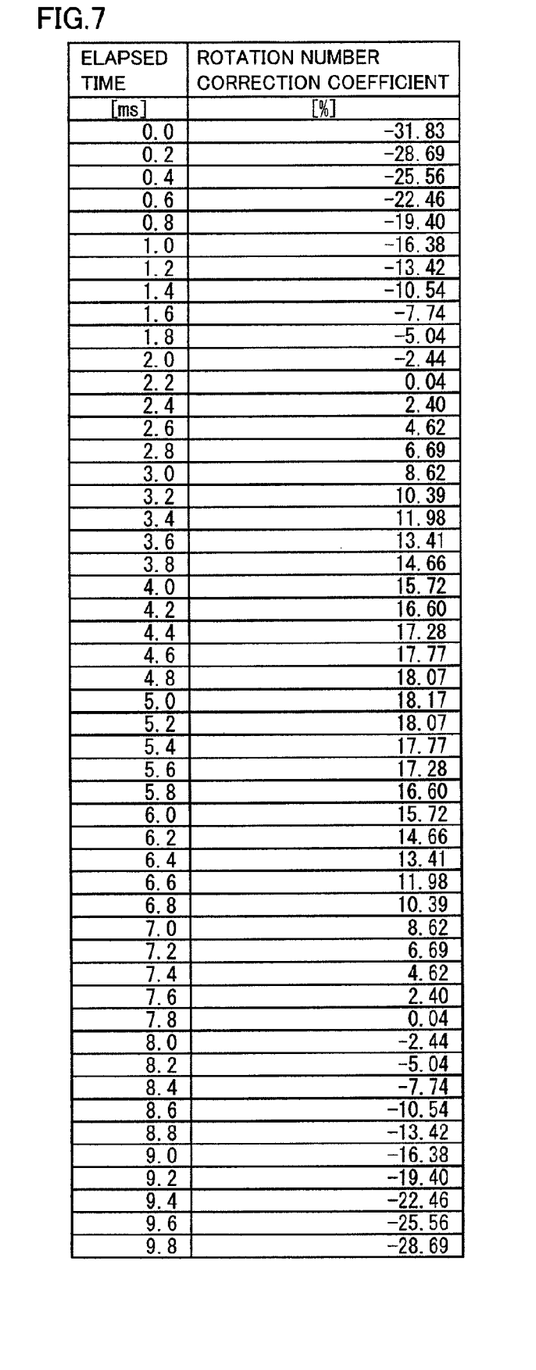
FIG. 7 is a drawing explaining a rotation number correction coefficient data table according to the embodiment of the present invention.

FIG. 7 shows numerical values of the rotation number correction coefficient data table according to the embodiment of the present invention.

Specifically, numerical values for every 0.2 ms are shown assuming 10 ms to be one cycle.

The numerical values of the rotation number correction coefficient data table are values previously obtained by experiments which reduce a ripple in the motor current and allow the motor to drive stably.

FIG. 6(d) shows a rotation number correction coefficient data line based on the correction coefficient data of FIG. 7 when 0% is assumed to be a reference.

As shown in FIG. 6(d), the rotation number correction coefficient data line is a data line that matches the DC voltage waveform, and is set such that the rotation number correction coefficient is maximized at a zero-cross point.

For example, when the pre-correction rotation number is 2800 rpm and the elapsed time is 5.0 ms, the correction coefficient data is 18.17% from FIG. 7, and a rotation number correaction value will then be 2800 rpm×18.17%=about 509 rpm.

A post-correction rotation number will be 2800 rpm+509 rpm=3309 rpm.

When the elapsed time is 10 ms, i.e., 0 ms, the correction coefficient data is −31.83% from FIG. 7, and the rotation number correction value will then be 2800 rpm×(−31.83%) =about −891 rpm.

The post-correction rotation number will be 2800 rpm+(−891)=1999 rpm.

Here, the output frequency of the inverter when the rotation number is 1999 rpm will be 66.63 Hz since the motor is a quadrupole motor. Therefore, the frequency of the inverter is set at a value considerably distant from the frequency (100 Hz) of the ripple in the DC voltage.

That is, in this example, by detecting a zero-cross point, maximizing the correction coefficient data when the DC voltage drops to 0V at the zero-cross point so that the frequency of the inverter has a value considerably distant from the frequency of the ripple in the DC voltage, it is possible to suppress a ripple in the current waveform, and to detect a stable waveform of constant amplitude.

Figure 8:
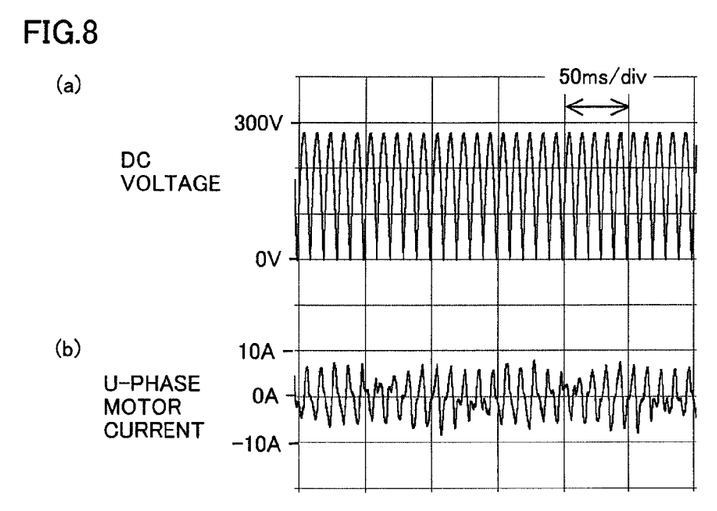
FIG. 8 is a drawing showing the relation between a DC voltage waveform and a U-phase motor current in the embodiment of the present invention.

FIG. 8 is a drawing showing the relation between a DC voltage waveform and a U-phase motor current in the embodiment of the present invention.

Referring to FIG. 8(a), a great ripple occurs in a DC voltage also as shown in FIG. 12(a), but it is possible to significantly reduce a ripple in the motor current as shown in FIG. 8(b) by correcting the target rotation number in accordance with the system described above. Here, the case in which the U-phase motor current has a current value falling within the limits of −10 A to 10 A is shown.

Accordingly, stable driving of the motor can be achieved, vibration and noise can be reduced, and degradation in efficiency can also be suppressed.

Moreover, FIG. 6(e) shows the relation between a pre-correction rotation number and a post-correction rotation number.

Here, the rotation number correction coefficient data table shown in FIG. 7 is set such that correction coefficient data has an average value of approximately zero. Specifically, by reducing the rotation number near the zero-cross point while increasing the rotation number in a period distant from the zero-cross point, the difference between an average rotation number (average value of post-correction rotation numbers) and a rotation number command value (pre-correction rotation number) of the motor can be generally be eliminated.

For example, if a difference arises between the average rotation number and the rotation number command value, it will be difficult to control the motor output with high accuracy.

For example, to cite the case of a motor driving device for a compressor of a refrigerator by way of example, the state of insufficient cooling is brought about when the average rotation number is smaller than the rotation number command value, and the state of excessive cooling is brought about when the average rotation number is larger than the rotation number command value. By generally eliminating the difference, the motor rotation number can be a target rotation number as a whole, thus enabling highly accurate control.

In the present example, although a data table for a single rotation number correction coefficient has been described as an example, it is also possible to provide a data table for rotation number correction coefficients in accordance with target rotation numbers.

FIG. 9 shows a data table for multiple rotation number correction coefficients that can be varied in accordance with the rotation number command value (pre-correction rotation number) of the motor.

When the output frequency of the inverter relative to a target rotation number is not a value proximate to the frequency of a ripple in the DC voltage, for example, when the target rotation number is less than 2000 rpm or more than or equal to 4000 rpm, the range of correction coefficient data can be narrowed.

It is noted that, by previously conducting experiments, values that reduce variations in the motor current and allow the motor to drive stably can be determined as values of the above-described data table for rotation number correction coefficients.

As described above, the present embodiment can avoid using a coil unlike a conventional configuration and allows a small-capacity capacitor of about $\frac{1}{100}$ of the capacity of a conventional smoothing capacitor to be used across buses of the inverter. In that case, even under the condition where a great ripple occurs in a DC voltage, stable driving of the motor can be achieved, vibration and noise can be reduced, and degradation in efficiency can also be prevented. Moreover, the motor output can be controlled with high accuracy.

By using a small-capacity capacitor of about $\frac{1}{100}$ of the capacity of a conventional smoothing capacitor across buses of the inverter, a compact, lightweight and low-cost inverter device can be implemented.

By performing inverter control using detected AC voltage/current phase difference information, stable rotation can be made, without using a sensor that detects the rotor position, in motor driving by 180-degree conduction including low-noise, low-vibration and highly efficient sine wave conduction.

It should be understood that the embodiment disclosed herein is illustrative and non-restrictive in every respect. The scope of the present invention is defined by the claims, and is intended to include any modification within the meaning and scope equivalent to the terms of the claims.

REFERENCE SIGNS LIST

1 motor; 2 inverter; 3 converter circuit; 4 AC power supply; 5 current sensor; 6 motor current detection amplifier; 7 controller; 8 phase difference detection unit; 9 target phase difference information storage unit; 10 addition unit; 11 PI operation unit; 12 rotation number setting unit; 13 sine wave data table; 14 sine wave data creation unit; 15 PWM creation unit; 16 correction coefficient data extraction unit; 17 rotation number correction coefficient data table; 18 corrected rotation number creation unit; 20 full wave rectifying circuit; 30 zero-cross detection unit; 32 voltage sensor.

The invention claimed is:

1. A motor control device comprising:
a rectifying circuit having a single-phase AC power supply as an input;
an inverter connected to said rectifying circuit and converting DC power obtained in said rectifying circuit into three-phase AC power to drive a motor;
a control device controlling said inverter; and
a zero-cross point detection unit detecting a zero-cross point of said single-phase AC power supply,
said control device including
rotation number setting means setting a rotation number of said motor, and
rotation number correction means correcting the rotation number of said motor set by said rotation number setting means in accordance with an elapsed time since detection of said zero-cross point by said zero-cross point detection unit.

2. The motor control device according to claim 1, wherein an extremely small-capacity capacitor is connected across buses of said inverter.

3. The motor control device according to claim 1, wherein said rotation number correction means corrects a target rotation number based on a correction coefficient of a correction coefficient data table previously defined in accordance with the elapsed time since detection of said zero-cross point.

4. The motor control device according to claim 3, wherein said correction coefficient is defined as a value such that a total of correction coefficients defined in said correction coefficient data table for said target rotation number is approximately zero.

5. The motor control device according to claim 3, wherein said correction coefficient data table is provided for each target rotation number.

* * * * *